(12) United States Patent
Segall et al.

(10) Patent No.: US 9,544,433 B2
(45) Date of Patent: *Jan. 10, 2017

(54) MANAGING INTERACTIVE COMMUNICATIONS CAMPAIGNS USING A HOLD QUEUE

(71) Applicant: Soundbite Communications, Inc., Bedford, MA (US)

(72) Inventors: Timothy R. Segall, Lexington, MA (US); Damon Weinstein, Arlington, MA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/100,813

(22) Filed: Dec. 9, 2013

(65) Prior Publication Data

US 2014/0301542 A1 Oct. 9, 2014

Related U.S. Application Data

(63) Continuation of application No. 13/620,778, filed on Sep. 15, 2012, now Pat. No. 8,605,887, and a continuation of application No. 12/350,745, filed on Jan. 8, 2009, now Pat. No. 8,280,031.

(51) Int. Cl.
*H04M 3/51* (2006.01)
*H04M 3/42* (2006.01)
*H04M 3/523* (2006.01)

(52) U.S. Cl.
CPC ....... *H04M 3/5191* (2013.01); *H04M 3/42365* (2013.01); *H04M 3/51* (2013.01); *H04M 3/5232* (2013.01); *H04M 3/5233* (2013.01)

(58) Field of Classification Search
USPC ..................................... 379/266.07
See application file for complete search history.

(56) References Cited

U.S. PATENT DOCUMENTS

| | | |
|---|---|---|
| 4,988,209 A | 1/1991 | Davidson et al. |
| 5,008,930 A | 4/1991 | Gawrys et al. |
| 5,640,445 A | 6/1997 | David |
| 5,825,870 A | 10/1998 | Miloslavsky |

(Continued)

OTHER PUBLICATIONS

International Searching Authority Written Opinion for PCT/US2010/020415, dated Aug. 26, 2010, 5 pages.

*Primary Examiner* — Joseph J Nguyen
(74) *Attorney, Agent, or Firm* — Lewis Roca Rothgerber Christie LLP

(57) ABSTRACT

A web-based hosted solution through which business entities create and manage communications campaigns is described. To reduce latency of customer-to-agent connections, the system implements an agent stay-on-line function by which a persistent telephony connection is established and maintained between the system infrastructure and an available agent. In this manner, the agent may handle multiple customers while avoiding an ACD hold queue. In addition, preferably a service-side hold queue also is established and maintained on the service-side of the infrastructure. This hold queue maintains calls that are waiting to be connected to available agents. It ensures that any customer abandons do not impair the connections being established and maintained to the agents.

22 Claims, 5 Drawing Sheets

(56) References Cited

U.S. PATENT DOCUMENTS

| | | | |
|---|---|---|---|
| 5,963,635 A | 10/1999 | Szlam et al. | |
| 5,991,395 A | 11/1999 | Miloslavsky | |
| 6,278,776 B1 | 8/2001 | Mark et al. | |
| 6,285,752 B1 | 9/2001 | Rice | |
| 6,363,145 B1 | 3/2002 | Shaffer et al. | |
| 6,563,920 B1 | 5/2003 | Flockhart et al. | |
| 6,621,900 B1 | 9/2003 | Rice | |
| 6,842,772 B1 | 1/2005 | Delaney et al. | |
| 6,883,170 B1 * | 4/2005 | Garcia | G06F 11/1438 707/999.001 |
| 6,931,112 B1 | 8/2005 | McFarland et al. | |
| 6,980,640 B2 | 12/2005 | Rice | |
| 7,046,789 B1 * | 5/2006 | Anderson | H04M 3/5175 379/265.01 |
| 7,103,562 B2 | 9/2006 | Kosiba et al. | |
| 7,110,524 B2 | 9/2006 | Rupe et al. | |
| 7,184,521 B2 | 2/2007 | Sikora et al. | |
| 7,386,102 B2 | 6/2008 | Summe et al. | |
| 7,564,962 B1 * | 7/2009 | O'Keeffe et al. | 379/265.09 |
| 7,873,157 B1 * | 1/2011 | Sim | 379/266.08 |
| 8,270,575 B2 | 9/2012 | Segall et al. | |
| 8,270,594 B2 | 9/2012 | Segall et al. | |
| 8,280,031 B2 | 10/2012 | Segall et al. | |
| 8,379,834 B2 | 2/2013 | Weinstein et al. | |
| 8,462,918 B2 | 6/2013 | Segall et al. | |
| 8,605,887 B2 | 12/2013 | Segall et al. | |
| 8,718,270 B2 | 5/2014 | Segall et al. | |
| 9,307,086 B2 | 4/2016 | Segall et al. | |
| 2001/0025329 A1 | 9/2001 | Sheikh et al. | |
| 2002/0067823 A1 * | 6/2002 | Walker | H04M 3/428 379/266.01 |
| 2003/0037113 A1 | 2/2003 | Petrovykh | |
| 2004/0029638 A1 | 2/2004 | Hytcheson et al. | |
| 2004/0120502 A1 * | 6/2004 | Strathmeyer et al. | 379/265.01 |
| 2005/0169235 A1 | 8/2005 | Hutcheson et al. | |
| 2006/0008073 A1 | 1/2006 | Yoshizawa et al. | |
| 2006/0256949 A1 * | 11/2006 | Noble, Jr. | H04M 3/5231 379/265.01 |
| 2007/0041562 A1 | 2/2007 | Bernier | |
| 2007/0121894 A1 * | 5/2007 | Noble, Jr. | H04M 3/5158 379/265.02 |
| 2007/0172050 A1 * | 7/2007 | Weinstein | H04M 3/5175 379/266.07 |
| 2007/0201674 A1 | 8/2007 | Annadata et al. | |
| 2008/0235342 A1 | 9/2008 | Aaltonen et al. | |
| 2010/0172487 A1 | 7/2010 | Segall et al. | |
| 2010/0172488 A1 | 7/2010 | Segall et al. | |
| 2013/0223615 A1 | 8/2013 | Segall et al. | |
| 2013/0223616 A1 | 8/2013 | Segall et al. | |
| 2015/0036818 A1 | 2/2015 | Segall et al. | |

* cited by examiner

MANAGING INTERACTIVE COMMUNICATIONS CAMPAIGNS USING A HOLD QUEUE

BACKGROUND

Technical Field

This disclosure relates generally to a method and system for managing interactive communication campaigns over a computer network, such as the Internet.

Description of the Related Art

It is known to provide a web-based hosted solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts, and defines one or more parameters that govern how the campaign is to be run. At a designated time, the service provider initiates the campaign, e.g., by providing the contacts to a set of telephone servers that set-up and manage the telephone calls to the targets of the campaign. During a given outbound call, as noted above, a recipient (a "customer") may be afforded an option to connect to a contact center, e.g., to speak to a customer representative. In such implementations, the hosted solution typically is integrated directly with the contact center's on-premises automatic call distributor (ACD).

BRIEF SUMMARY

The subject matter herein describes a web-based hosted solution (a managed service or system) through which business entities create and manage communications campaigns, such as interactive campaigns that afford target recipients an opportunity to be connected to a call center. To reduce latency of customer-to-agent connections, the system implements an agent stay-on-line function by which a persistent telephony connection is established and maintained between the system infrastructure and an available agent. In this manner, the agent may handle multiple customers while avoiding a contact center ACD (automated call distributor) hold queue. In addition, preferably a service-side hold queue also is established and maintained on the service-side of the infrastructure. This hold queue maintains calls that are waiting to be connected to available agents. It ensures that any customer abandons (on the service side) do not impair the connections that are being established and maintained to the agents.

The managed service carries out a communications campaign on behalf of a client. A "campaign" may have associated therewith one or more "sub-campaigns". A campaign typically has a preset configuration that applies to all of its sub-campaigns. Using a Web interface, a client loads a list of contacts that will be called and associates that list with a script, which defines what will happen during a phone call to a contact. A "sub-campaign" refers to one or more passes through a contact list that has been bound to a script and that has been associated with a timeframe Thus, a "sub-campaign" associates a list of contacts, a script, and a timeframe. Preferably, a given agent also is associated with a skill group, which is a grouping based on one or more business requirements. When a new sub-campaign is created, a skill group is assigned to that sub-campaign. The schedule for the skill group then determines the calling rate at any given time. As more agents come on duty, typically the calling rate increases to keep those agents busy. When fewer agents are on duty, however, calling rate decreases to avoid long hold queues for the customers that are being contacted. A single skill group can be assigned to multiple sub-campaigns at the same time. Calls from each sub-campaign preferably are sent to any available agent in the skill group. Preferably, there is a service-side hold queue for a particular skill group running a particular sub-campaign.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

Figure 1:
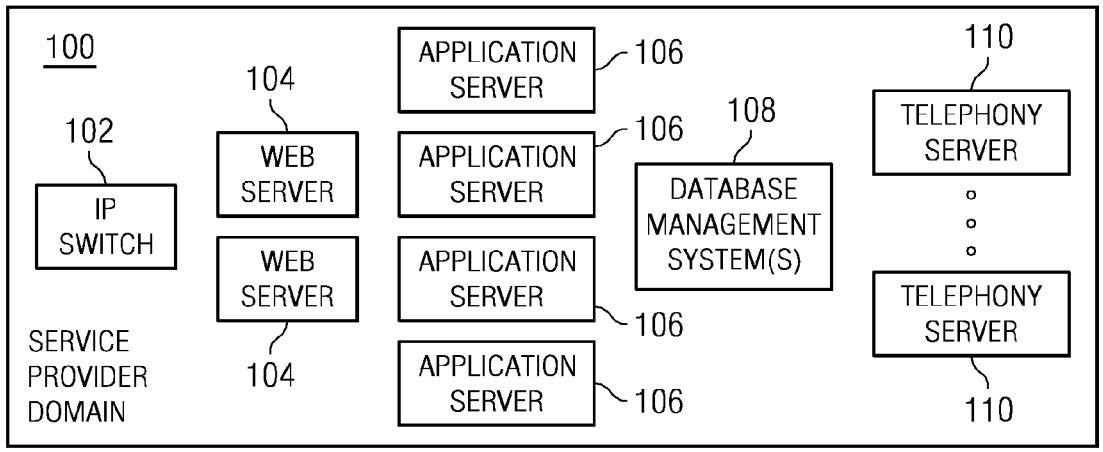
FIG. 1 is a block diagram of a service provider infrastructure for implementing a managed communications campaign service.

FIG. 1 illustrates a representative service provider or system architecture, which in the preferred embodiment is implemented in or across one or more data centers. A data center typically has connectivity to the Internet. The system provides a web-based hosted solution through which business entities create and manage communications campaigns. Campaigns may be interactive or non-interactive. Representative campaigns include, without limitation, account renewal campaigns, balance transfer or consolidation offer campaigns, billing issue campaigns, credit card activation campaigns, fraud alert campaigns, payment or past due reminder campaigns, phone or customer survey campaigns, debt recovery campaigns, late payment with right party verification campaigns, payment reminder with direct connect to call center campaigns, appointment reminder campaigns, welcome call campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, and the like. The particular type of campaign is not a limitation or feature of the invention.

A business entity (a "client") user has a machine such as a workstation or notebook computer. Typically, a business entity user accesses the service provider architecture by opening a web browser on the machine to a URL associated with a service provider domain. Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 9.2 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. In a card-based embodiment, a representative card is a CG 6565 (or variant) series available from Dialogic, or an equivalent. Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. The telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has up to 200 ports, and each port may be considered a separate telephone line. There are typically a set of such servers operating at a given location (e.g., an Internet data center). The following is a typical operation of the service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm. A control routine executing on the machine takes a first contact in the subset and assigns the contact to an available port. The script is then initiated and the interface card initiates a call over a port. When the recipient's phone is answered, the system determines whether a human being has answered the call (as opposed to an answering machine, a fax, or the like). If a human being has answered, the script plays a set of prompts (basically a set of scripted questions). During the call, if the target recipient takes a given action, a direct connect (DC) function is initiated. In particular, the system places the call on hold, opens up a separate line to a contact center telephone number (typically provisioned by the client), waits for an agent to respond, places the responding agent on hold, and then bridges the customer to the agent. The system then disconnects. In an alternative, the DC function may take place whether or not the recipient actively initiates it, e.g., by just having the system inform the recipient to "please hold" while the connection to the contact center is established by the service provider.

The contact center may be owned, operated or managed by a third party. In such a scenario, the agents may be described as being "un-owned" agents. The service provider may own, operate or manage the agents directly. A representative call center includes automatic call distribution (ACD) functions. As is well-known, an ACD is a computer-implemented and controlled telephone system that distributes calls to call center agents equitably and gathers statistics about the agents. When the service provider controls and/or manages the agents directly (sometimes referred to as "owned" agents, as contrasted with "un-owned" agents), the provider infrastructure may include a dialer, which is an automatic telephone dialing system. A dialer initiates outbound call from a list of telephone numbers, turns a call over to an agent when a human being responds, and gathers statistics about agents. Such ACD and dialer technologies are well-known.

Figure 2A:
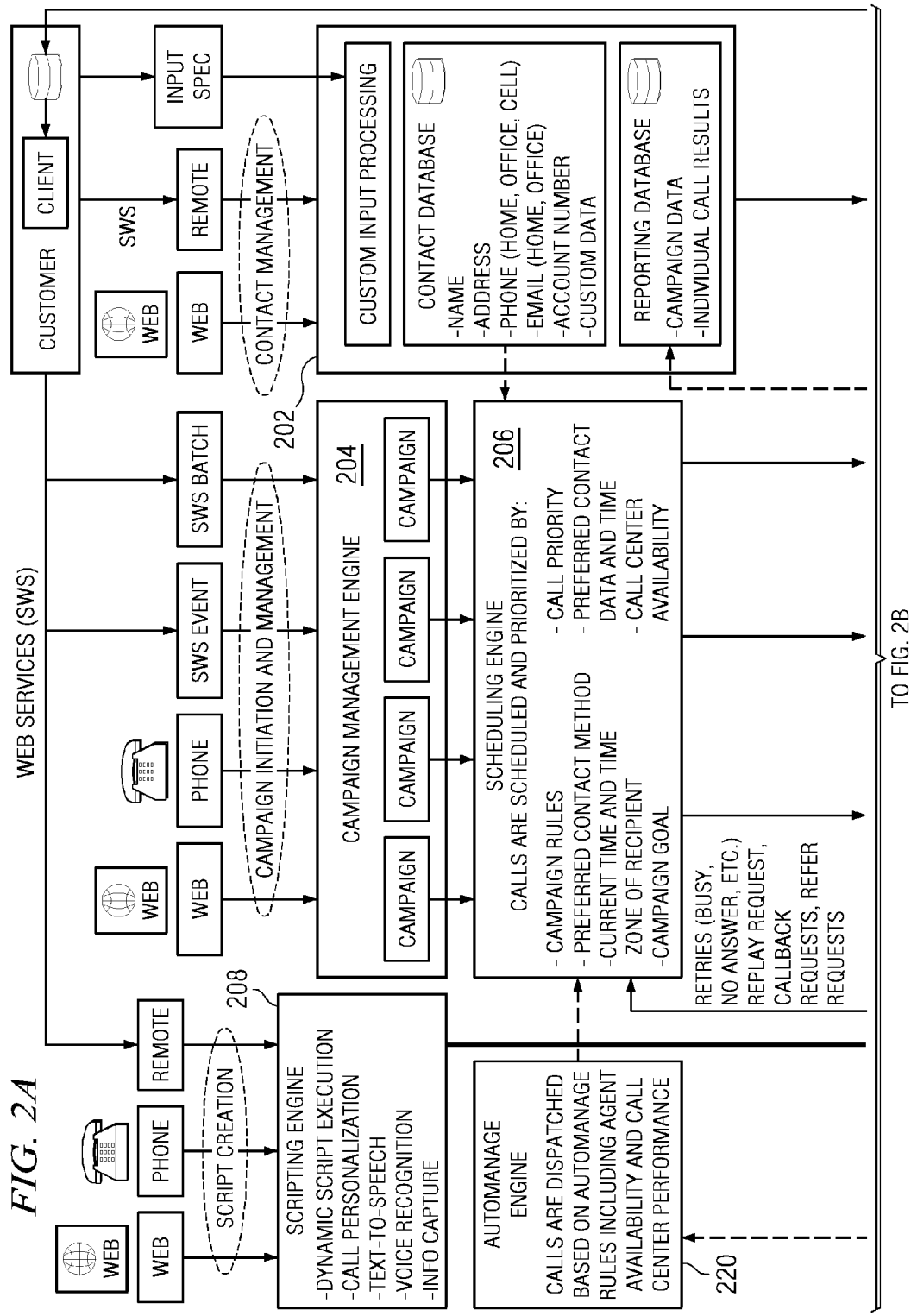
FIGS. 2A-2B illustrates how an interactive communications campaign is created and managed in the service provider infrastructure illustrated in FIG. 1.
Figure 2B:
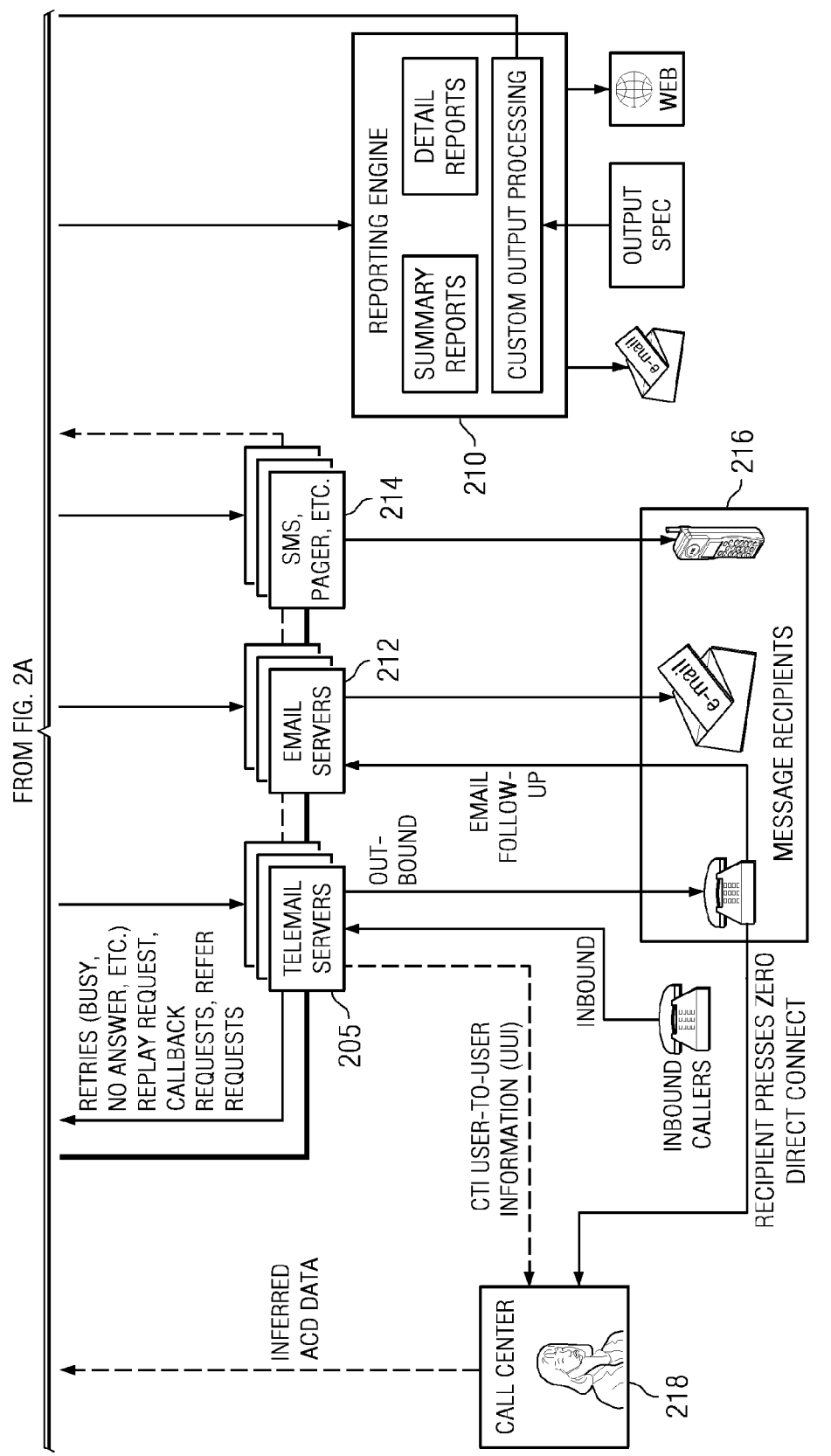

Using the service provider infrastructure, a business entity can create, execute and manage a campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. As noted above, a script determines what will happen during a phone call. Typically, a script is formatted as XML and specifies a sequence of audio prompts that are played and what happens when the recipient takes certain actions such as pressing a button on the phone or speaking a response. As noted above, a direct connect to the contact center may be carried out automatically (merely when the system determines that the call has been answered by other than an answering machine) and thus the script may designate this functionality. One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information. With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

As also illustrated in FIGS. 2A-2B, after connecting an outbound call to a target customer 216, the customer may elect to be connected to the contact center 218 (typically a third party call center) or the system may perform that direct connect automatically once it determines that a human being (as opposed to an answering machine) has answered the outbound call. The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is illustrated in FIG. 2 by the control engine 220, which can be provided in software as a set of software instructions executable on a processor. The engine is responsible for dispatching calls at an appropriate rate while ensuring that all customer-requested rule parameters (as described below) are honored. Examples of such parameters include: number of agents available at the call center, maximum hold time at the call center, client abandon rate prior to speaking to a call center, number of bad numbers reached on the outbound dial, and so forth. Generally, for a given client campaign or sub-campaign, the engine 220 decides on an initial call dispatch rate based on the client-requested parameters (and, optionally, on historical data from like campaigns or sub-campaigns). Once the campaign or sub-campaign, as the case may be, starts running, the engine 220 monitors the parameters and ensures that they remain within tolerance. If an identified parameter exceeds the client-defined value, then a system action rule (e.g., adjusting the call dispatch rate, suspending the calls, or the like) is applied and any client notification requested is issued. Additional details regarding the functionality of the engine 220 are described in U.S. Publication No. 2007/0172050, which is commonly-owned.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance.

As used herein, the following terms have the associated meanings. A "campaign" refers to an overall series of calls to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a phone call. Typically, the script specifies a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

An "agent" typically is a call center operator. A "skill group" is a set of agents that are trained to handle a given script. In one embodiment, a skill group defines the number of agents who are scheduled to be on duty at various times of the day on various days of the week, as well as the phone number to use to contact those agents. A skill group can be shared across multiple sub-campaigns or over multiple physical facilities (e.g., telephone numbers). A script may cause the routing of direct connect calls to different skill groups based on the path through the script. A client of the service may assign a skill group to a sub-campaign when it creates the sub-campaign, whereupon the agents in that skill group are then responsible for handling any incoming calls for that sub-campaign. Agents in a skill group become "live" according to a schedule or upon login to the service provider. Thus, in one embodiment a "live" agent is an agent that has been registered with the service provider, e.g., using a supervisor dashboard or a contact center schedule. An "unallocated" agent is an agent that is not yet allocated to a sub-campaign. An "allocated" agent is an agent that is allocated to a sub-campaign. A "busy" agent is an agent on the telephone with a client. An "available" agent is an agent waiting for a call. A "break" is a state when the agent is away from his or her station. The acronym "ACW" refers to "after-call-work" or agent processing, which occurs after a particular customer call is completed and before the agent is connected to a new customer call.

In one embodiment, agents in a skill group are automatically allocated to a particular sub-campaign based on a priority of each running sub-campaign. Thus, for example, sub-campaigns with a higher priority are given as many agents as they can use before a lower-priority sub-campaign is considered. Sub-campaigns of equal priority are allocated agents according to a number of agents that can be used (or the number of callable contacts) in a next time period (e.g., 5 minutes). In the alternative, such prioritization of sub-campaigns need not enforced across agents in a skill group, thereby enabling more equal access to the agents. The agents allocated to each sub-campaign typically changes over time as the number of callable contacts changes (which affects the number of agents that can be used by each sub-campaign). Preferably, the system adjusts calling rate for a sub-campaign based on several factors: the number of agents currently allocated to the sub-campaign, the percentage of call attempts that result in a direct connect attempt, and an average length of a successful direct connect call. Typically, a skill group is based on one or more business requirements. For example, skill groups may be based on skill type, language skills, skill level, or other such factors. When a new sub-campaign is created, a skill group is assigned to that sub-campaign. The schedule for the skill group then determines the calling rate at any given time. As more agents come on duty, typically the calling rate increases to keep those agents busy. When fewer agents are on duty, however, calling rate decreases to avoid long hold queues for the customers. As noted above, a single skill group can be assigned to multiple sub-campaigns at the same time. Calls from each sub-campaign preferably are sent to any available agent in the skill group, so a given agent should be trained to handle calls from each of the sub-campaigns.

There may be different types of skill groups: a standard skill group, an enhanced shared mode skill group, and an enhanced agent mode skill group. The standard skill group typically is a skill group to which a single phone number is assigned, and that number is a default phone number when there is no other number defined in the script. A standard skill group typically does not use a service-side hold queue, as defined below. With a standard skill group, agents always hang up after the client call has completed. Caller ID (or, in the alternative, whisper) is used to generate an agent screen pop-up window (with the correct client information) because agents hang up between calls. With an enhanced shared mode skill group, the agents typically conform to a pre-defined schedule, and the schedule automatically changes the number of agents throughout the day. In this configuration, agents share one or more telephone numbers, and a schedule may be created for each phone number (alternatively, multiple phone numbers can share a schedule). Agents in the enhanced shared mode skill group use a service-side hold queue (as described in more detail below), and agents have the option to "stay-on-line" (remain connected and to receive a next customer after the last customer hangs-up, as described in more detail below). If agents remain connected, caller ID typically is not used for the screen pop-up because caller ID cannot be changed after the first call the agent's phone has been placed. In the enhanced agent mode skill group mode, contacts connect directly to a specific agent who has his or her own unique telephone number. Thus, when this type of skill group is configured, individual agents are added (by name) together with the associated telephone numbers. In this configuration, each agent has a unique phone number, or each agent may be set up with a different extension where one or more agents share the unique phone number. As with the standard and enhanced shared mode configurations, agent mode skill groups use a pre-defined schedule. Individual agents, however, can each have a custom schedule or can participate in a common schedule group. The service provider can track individual agent activity in this mode, and agents use the hold queue and can stay-on-line as described above. In this mode, caller ID is not used for an agent screen pop-up window, and agents who are not actively allocated to a running sub-campaign are identified as unassigned.

Figure 3:
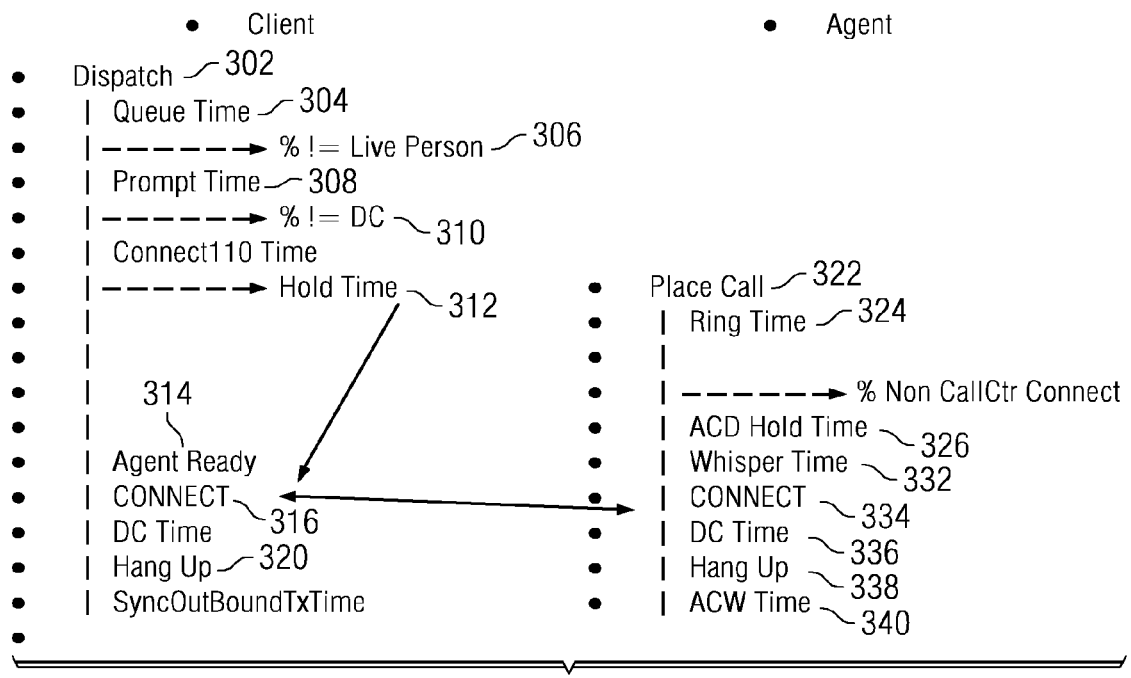
FIG. 3 illustrates representative event sequences that occur when a customer request call is initiated as well as when an agent connect call is initiated.

By way of background, FIG. 3 illustrates the customer-side and agent connection latencies that may occur when a customer is contacted by the system and (at the customer's request or otherwise, such as automatically) then connected to an un-owned agent. In this figure, the left-side illustrates the typical details of the call (and the associated call latencies) from the dialer to the customer, and the right-side illustrates the typical details of the separate call that is made by the service provider to the agent (typically at the third party contact center). The two sides of the figure are aligned from a temporal perspective. Looking first at the left-side, the customer call starts with a dispatch 302. After a queue time 304 (for the call set-up and connection), the call reaches a live person (namely, the "client") at 306. After a prompt time 308 (the time needed to prompt the customer with a particular request as indicated by the script), it is assumed that the customer takes a given action to request a direct connect (DC) to the agent. This is indicated at 310. (In the alternative, as noted above, the customer may simply be put on "hold" while the direct connect is initiated without requiring the prompt-response sequence. Thus, step 308 might involve a "no action" situation). At this point, the customer has to wait for the connection to be established. This is represented by the hold time at 312. After a determination that an agent is ready at 314, a "connect" occurs at 316, at which point the customer is connected (bridged) to the agent. After the customer or the agent hangs up, the customer call is disconnected at 320.

Meanwhile, and as shown in the right-hand side of the figure, the system places a call to an agent. This is shown at 322. Until the agent call is answered, a ring time period 324 exists. When the call is connected at the ACD, it enters an ACD hold time 326 followed by a wait time (not shown). A determination then is made that there is a real customer ready to be handed off to an available agent. At 332, a whisper time (which is optional) occurs during which the agent is provided information about the client and the call. Thereafter, at 334, the "connect" occurs, and this corresponds to the "connect" on the left-side of the figure. Thus, the customer is now bridged to the agent. After the corresponding direct connect time 336 expires, the agent call is disconnected at 338. After the hang-up, the agent performs his or her after-call-work (ACW) 340. The agent then returns to his or her "available" state.

According to a feature of the described subject matter, it is desired to reduce the client-side latency and to provide more efficient use of agents. In particular, it is desired to provide a nearly immediate handoff of the customer to an available agent whenever possible such that customer connect time is significantly reduced and the agent has the information he or she needs at the outset to facilitate the client interaction. This reduces the number of customer abandons, reduces agent idle time, and provides a more efficient and cost-effective solution for both the business entity client and the service provider itself.

To this end, preferably a persistent connection maintained between the service provider system and a given agent. This function is sometimes referred to herein as "stay-on-line" because it obviates making a separate agent call each time it might be desired to establish a customer-agent interaction. The persistent connection may be established in an "on-demand" or "just-in-time" manner, i.e., when an available agent is first needed to handle a direct connect, or the service provider may pre-provision (or pre-configure) the agent in advance, such as when an agent first indicates his or her availability. In either case, once the agent is "on-line" to the service provider, the agent connection is maintained for so long as possible so that a new customer direct connect can be provided to that agent as soon as the agent completes ACW from a prior (just completed call). Thus, and in the context of FIG. 3, when an agent stays-on-line in this manner, time periods 322, 324, and 326 (call set-up, ring time, and ACD hold time in an ACD hold queue) are advantageously avoided for subsequent calls (or, if the system calls the agent before the first customer request, then for all calls). With the stay-on-line operation, the agent logs into the service provider system (e.g., via a web browser-based application) or simply logs into the native contact center system itself, and the service provider system then establishes (or can establish, as needed) and maintains a persistent telephony connection to the agent. The agent provides his or her status to the service provider system or the native contact center system. Upon a direct connect request (from a customer), either the service provider or the contact center system provides a screen pop-up (or other notification) to the agent and then connects the customer to the agent. The screen pop-up (described in more detail below) obviates the whisper time 332 shown in FIG. 3, because the customer call information can be provided visually (via the pop-up display window). In an alternative, the stay-on-line feature may be used without the screen pop-up, in which case a whisper may be used. Upon completion of the call (including any necessary ACW), the agent then indicates (e.g., by selecting a button) he or she is ready for the next call (which corresponds to 330). As can be seen then, with stay-on-line functionality, there is no requirement that the system place a separate new call to the agent or wait for a connection or ACD hold time.

Figure 4:
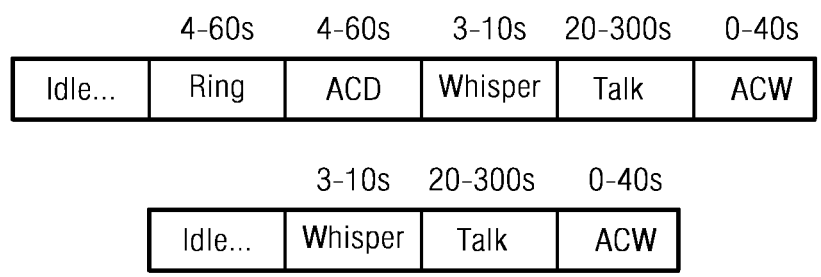
FIG. 4 illustrates how a stay-on-line function reduces customer-to-agent latency according to one feature of the disclosed subject matter.
Figure 5:
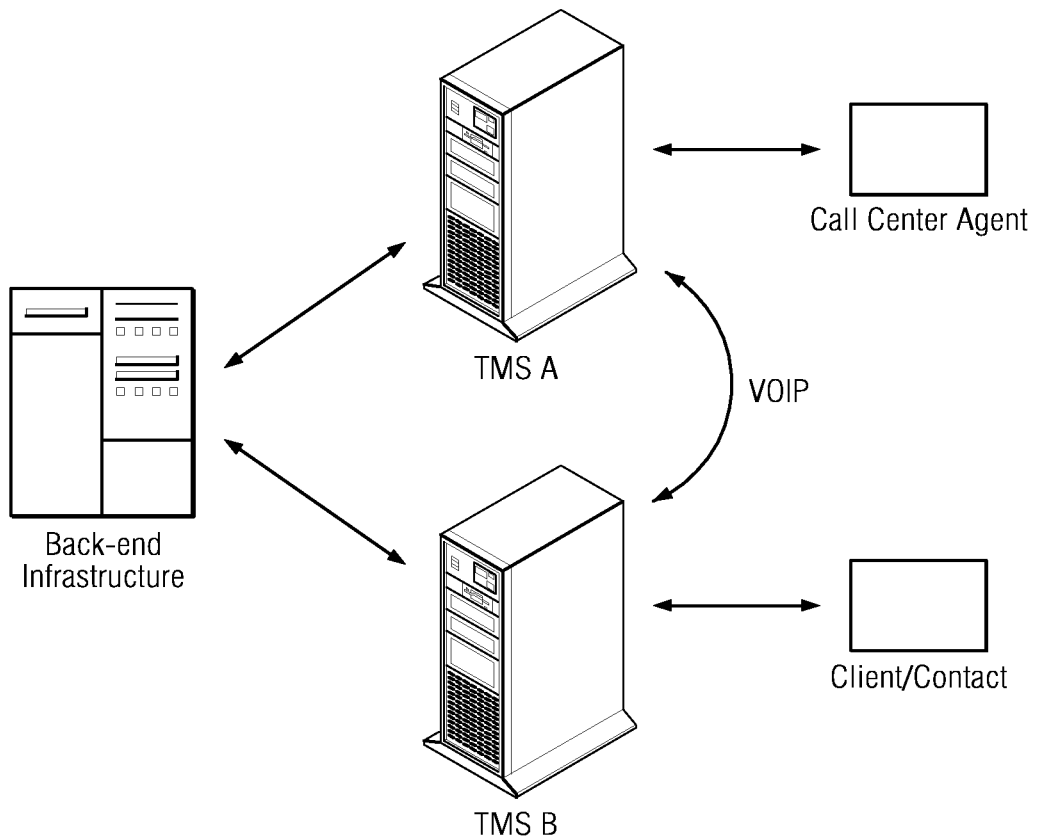
FIG. 5 illustrates a preferred inter-TMS architecture for the service provider system.

FIG. 4 illustrates a typical agent handoff comparison when the stay-on-line feature is implemented. The timing shown is merely representative. In the first timeline (without the feature), there is idle time, ring time, ACD hold time, whisper time, talk time, and ACW time. With the stay-on-line feature enabled, however, there is only idle time, whisper time (which itself may be avoided using the screen pop, as described in more detail below), talk time, and ACW time. Thus, the function provides much more efficient use of agents, and much reduced customer call latency. A main advantage of this approach is that the agent connection can be initiated before a customer requests a connection to an agent. This approach also avoids the loss of the agent in the ACD hold queue position when a customer abandons the call. Further, an agent that handles multiple customers in this manner (i.e., without disconnecting from the service) avoids the ACD hold queue, further reducing customer hold times. To facilitate the stay-on-line functionality, preferably the system implements calls for both the customer call and agent call using a voice-over-IP infrastructure (VoIP). This is illustrated in FIG. 5. In this diagram, the service provider system includes a first telephone management system (TMS A) that is used to establish calls to the call center agents, as well as a second telephone management system (TMS B) that is used to establish calls to the customer contacts. The system also includes a back-end, as has been described. In this embodiment, inter-TMS communications preferably take place using VoIP connections as indicated. Although this configuration is preferred, the system may also be implemented without inter-TMS VoIP, in which case the agents must be managed on a per-TMS basis. Moreover, the above-described functionality does not require VoIP for implementation.

A particular agent (typically as provisioned by skill group) may stay-on-line "never," "when busy," or "always." When stay-on-line "never" is selected as an option, the system hangs-up on the agent after a call is completed, and it then calls the agent back as necessary. The stay-on-line when busy (or when work available) option means that the feature is enabled for the agent when there is work to do, i.e., a non-zero hold queue. The stay-on-line always options means that the feature is enabled for the agent at all times after the agent has logged into the service provider (or the contact center ACD). The preferred option is stay-on-line always. The particular stay-on-line option can be set on an per-agent basis, on a per-skill group basis, or on some other basis.

According to another feature, the service provider infrastructure (on its side, in contrast to the third party call center) includes a hold queue. Physically, the hold queue is a portion of a service provider database structure (or, in the alternative, some allocated physical memory) that is associated with a given sub-campaign and that is used to "hold" direct connect(s) waiting to be bridged to available agent(s) at the contact center. This queue has been referred to above as the service-side hold queue, which is in contrast to the ACD hold queue. While a hold queue is typically associated with a sub-campaign, this is not a requirement, as there may be a hold queue associated with a set (or subset) of agents having a given skill group. Because there are often multiple sub-campaigns (and/or skill groups, as the case may be), there are multiple hold queues. In one embodiment, the service-side hold queue is associated with a particular skill group running on a particular sub-campaign. A particular call on the customer side is placed in the service-side hold queue (and maintained there) after the customer requests a direct connect in the event the service provider ascertains (upon the DC) that no agent is then available to receive the particular call. The "hold queue" ensures that, in the event the customer abandons, the persistent agent connection is not wasted. Another benefit of the hold queue is that an agent that stays on the line can then get the next customer from the hold queue itself. By combining the service-side hold queue with the stay-on-line agent, the system provides reduced customer connect-to-agent latency and ensures that agents are used more effectively.

The system preferably executes a program to provide an agent "portal" by which an administrator (e.g., a supervisor) can administer and manage agents. The portal typically includes an agent screen, and a supervisor screen. A server component executes in the service provider system infrastructure, and a client component executes in the agent's desktop, preferably in a web browser. As noted above, when the system is operating in the enhanced agent mode skill group configuration, the status of the individual agents can be viewed. This view contains information, such as the client contact with whom the agent is being connected. In this embodiment, a web page can be used as a screen pop to pass information to the agent about the contact. Typically, an agent operating in this mode has the following mutable attributes: skill group, telephone number, sub-campaign, and state (e.g., unallocated, available, busy, ACW, handoff, break, hold queue, or unavailable). The agent also can be visualized from the perspective of his or her identity, authentication information, permissions and access rights. Preferably, upon connection to the service provider or the appropriate contact center system, the agent's screen is refreshed periodically (e.g., once per second). The server-client screen pop functionality may be implemented in any convenient manner using existing technologies such as Comet, AJAX, XMPP, and the like. Comet is a WWW architecture in which a web server sends data to a client program (normally a web browser) asynchronously without any need for the client to explicitly request it. This allows for the creation of an event-driven web application. XMPP refers to eXtensible Messaging and Presence Protocol (f/k/a Jabber), which is an open, XML-based protocol for near real-time, extensible instant messaging (IM) and presence information (a/k/a buddy lists). XMPP is extensible and can support other features such as voice over IP (VoIP) and file transfer. In a representative embodiment, an agent has a telephony connection and an associated machine (e.g., a desktop computer, a laptop computer or other mobile computing device, or the like) that comprises a web browser or other rendering engine that is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

In operation, each agent is associated at the server with an agent object. Every agentPortal.heartBeatInterval, the agent's browser sends the server an AJAX-style message to update the server; this represents a heartbeat. Periodically, e.g., once per minute, all agents that are logged-in to the server are evaluated to see if their respective heartbeats are older than an agentPortal.sessionTimeOutSecs (e.g., one minute). If the heartbeat for a particular agent is older, then a poller transitions the agent to lostConnection. If the heartbeat thereafter reactivates, the system will automatically transition the agent to an available state. If an agent object has been in a lostConnection state for more than agentPortal.autoLogOutSecs (e.g., 15 minutes), the system will automatically log the agent out after an agentPortal.sessionTimeOutSecs (e.g., one minute). Also, after an agent has been on a break for more than agentPortal.maxBreakSeconds, he/she will automatically be logged out.

Figure 6:
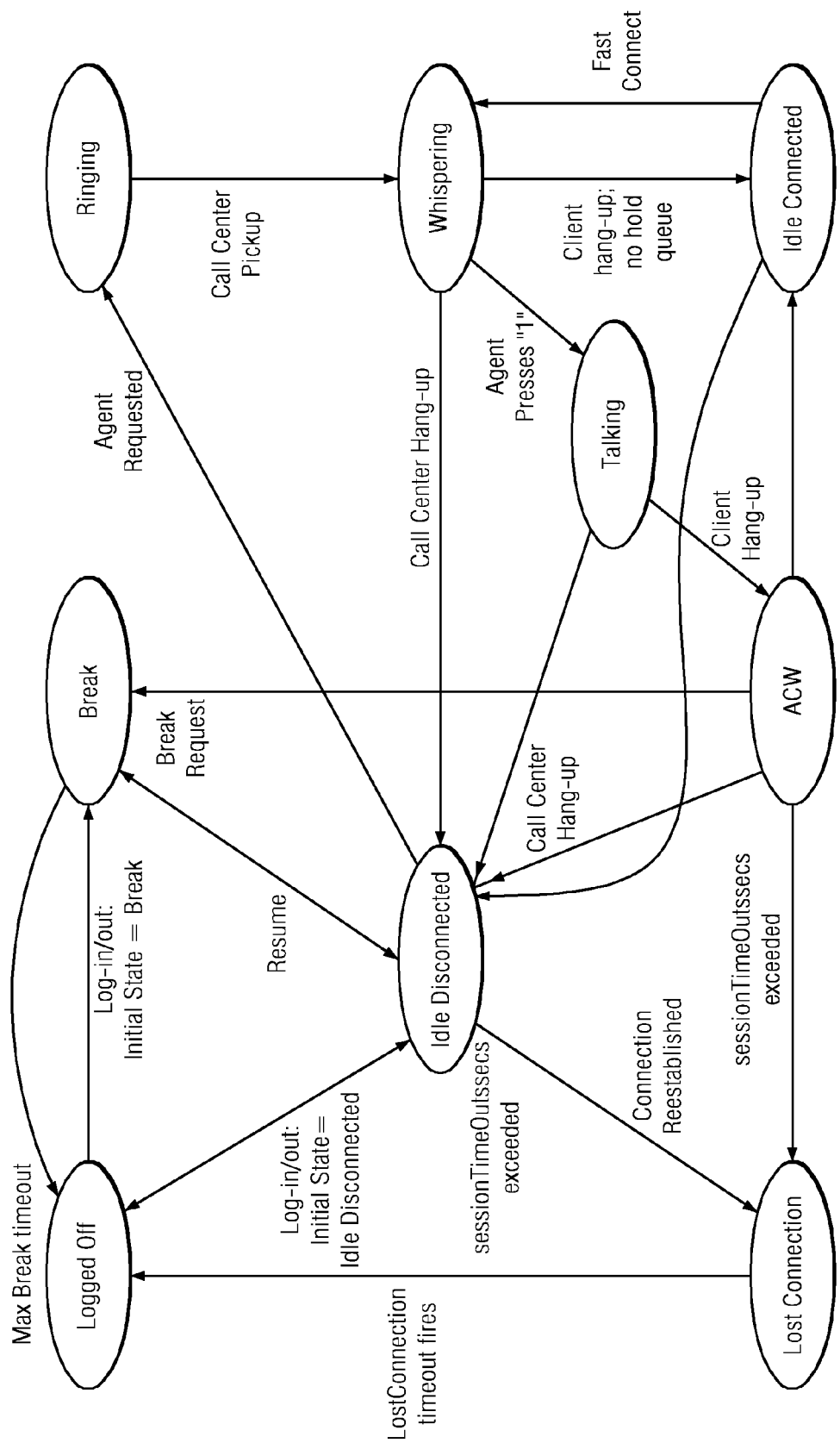
FIG. 6 illustrates a state diagram for a particular agent.

FIG. 6 illustrates a state machine for a typical agent. In this state machine, the whispering state (as shown) may be omitted.

The following describes a typical life cycle for an unowned agent. Once an agent enters the live state, he or she is typically unallocated. Once the agent is allocated to a specific sub-campaign, he or she enters an available state. The system then establishes and maintains the persistent telephony connection to the agent, as previously described. Once a customer request occurs (a client has requested a direct connect), the agent enters various states, such as busy. After the call is completed, the agent enters (or may enter) the ACW state, after which the agent transitions back to the available state where he or she can receive a next call.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described our invention, what we now claim is set forth below.

The invention claimed is:

1. A system comprising:
a processor;
a memory, wherein the memory has stored thereon processor-executable instructions that, when executed by the processor, cause the processor to:
  establish a queue associated with a sub-campaign of a campaign, the queue comprising one or more held interactions;
  establish persistent telephony connections with one or more agents of a plurality of agents assigned to the sub-campaign, the plurality of agents being associated with a contact center;
  initiate one or more outbound interactions to one or more customers during a time period of the sub-campaign;
  determine whether a first outbound interaction should be routed to an agent of the one or more agents with established persistent telephony connections; and
  in response to determining that the first outbound interaction is to be routed to the agent:
    conditioned on determining that the agent is available, transmit processor-executable instructions to connect the first outbound interaction to the agent over a persistent telephony connection corresponding to the agent; and
    conditioned on determining that the agent is not available:
      place the first outbound interaction in the queue as a held interaction;
      detect when the agent is available;
      release the first outbound interaction from the queue in response to detecting that the agent is available; and connect the released first outbound interaction to the agent over the persistent telephony connection corresponding to the agent.

2. The system of claim 1, wherein the memory has further processor-executable instructions stored thereon that, when executed by the processor, cause the processor to:
control the number of outbound interactions initiated during the time period in accordance with a calling rate, and
determine the calling rate based on the number of agents assigned to the sub-campaign.

3. The system of claim 2, wherein the calling rate is further determined based on a percentage of outbound interactions that result in a direct connect attempt.

4. The system of claim 2, wherein the calling rate is further determined based on an average length of a successful direct connect.

5. The system of claim 2, wherein the calling rate is further determined based on a maximum hold time at the contact center.

6. The system of claim 2, wherein the calling rate is further determined based on an outbound interaction abandon rate prior to connecting to agents at the contact center.

7. The system of claim 2, wherein the calling rate is further determined based on a number of bad numbers associated with the outbound interactions.

8. The system of claim 1, wherein the memory has further processor-executable instructions stored thereon that, when executed by the processor, cause the processor to
determine that a connection of the first outbound interaction to the agent has terminated; and
connect a second outbound interaction of the outbound interactions to the agent after receipt of data indicating that the agent has entered and completed an after call work state associated with the first outbound interaction.

9. The system of claim 1, wherein the sub-campaign is one of: an account renewal campaign, a balance transfer or consolidation offer campaign, a billing issue campaign, a credit card activation campaign, a fraud alert campaign, a payment or past due reminder campaign, a phone or customer survey campaign, a debt recovery campaign, a late payment with right party verification campaign, a payment reminder with direct connect to call center campaign, an appointment reminder campaign, a welcome call campaign, an account renewal campaign, an affinity cross-sell/rewards program campaign, a crisis management/disaster recovery campaign, a new product offer campaign, an inquiry/web follow-up campaign, a contract renewal campaign, a service availability notification campaign, a promotional offer campaign, and a service delivery confirmation campaign.

10. The system of claim 1, wherein the memory has further processor-executable instructions stored thereon that, when executed by the processor, cause the processor to:
determine that a connection of the first outbound interaction to the agent has terminated; and
connect a second outbound interaction of the outbound interactions to the agent over the persistent telephony connection corresponding to the agent without initiating a new connection to the agent.

11. The system of claim 1, wherein establishing persistent telephony connections with one or more agents comprises:
determine that a selected option for the sub-campaign specifies that the plurality of agents are to remain online for a duration of the sub-campaign; and
in response to the determination, establish persistent telephony connections with the one or more agents.

12. The system of claim 1, wherein establishing persistent telephony connections with one or more agents comprises:
determine that a selected option for the sub-campaign specifies that the plurality of agents are to remain online for the sub-campaign when there are one or more held interactions in the queue; and
in response to the determination, establish persistent telephony connections with the one or more agents.

13. A method comprising:
establishing, by a processor, a queue associated with a sub-campaign of a campaign, the queue comprising one or more held interactions;
establishing, by the processor, persistent telephony connections with one or more agents of a plurality of agents assigned to the sub-campaign, the plurality of agents being associated with a contact center;
initiating, by the processor, one or more outbound interactions to one or more customers during a time period of the sub-campaign;
determining, by the processor, whether a first outbound interaction should be routed to an agent of the one or more agents with established persistent telephony connections; and
in response to determining that the first outbound interaction is to be routed to the agent:
conditioned on determining that the agent is available, transmitting, by the processor, processor-executable instructions to connect the first outbound interaction to the agent over a persistent telephony connection corresponding to the agent; and
conditioned on determining that the agent is not available:
placing, by the processor, the first outbound interaction in the queue as a held interaction;
detecting, by the processor, when the agent is available;
releasing, by the processor, the first outbound interaction from the queue in response to detecting that the agent is available; and
connecting, by the processor, the released first outbound interaction to the agent over the persistent telephony connection corresponding to the agent.

14. The method of claim 13, further comprising:
controlling, by the processor, the number of outbound interactions initiated during the time period in accordance with a calling rate, and
determining, by the processor, the calling rate based on the number of agents assigned to the sub-campaign.

15. The method of claim 14, wherein the calling rate is further determined based on a percentage of outbound interactions that result in a direct connect attempt.

16. The method of claim 14, wherein the calling rate is further determined based on an average length of a successful direct connect.

17. The method of claim 14, wherein the calling rate is further determined based on a maximum hold time at the contact center.

18. The method of claim 14, wherein the calling rate is further determined based on an outbound interaction abandon rate prior to connecting to agents at the contact center.

19. The method of claim 14, wherein the calling rate is further determined based on a number of bad numbers associated with the outbound interactions.

20. The method of claim 13, further comprising:
determining that a connection of the first outbound interaction to the agent has terminated; and connecting a second outbound interaction of the outbound interactions to the agent after receipt of data indicating that the agent has entered and completed an after call work state associated with the first outbound interaction.

21. The method of claim 13, wherein the sub-campaign is one of: an account renewal campaign, a balance transfer or consolidation offer campaign, a billing issue campaign, a credit card activation campaign, a fraud alert campaign, a payment or past due reminder campaign, a phone or customer survey campaign, a debt recovery campaign, a late payment with right party verification campaign, a payment reminder with direct connect to call center campaign, an appointment reminder campaign, a welcome call campaign, an account renewal campaign, an affinity cross-sell/rewards program campaign, a crisis management/disaster recovery campaign, a new product offer campaign, an inquiry/web follow-up campaign, a contract renewal campaign, a service availability notification campaign, a promotional offer campaign, and a service delivery confirmation campaign.

22. The method of claim 13, further comprising:
determining that a connection of the first outbound interaction to the agent has terminated; and
connecting a second outbound interaction of the outbound interactions to the agent over the persistent telephony connection corresponding to the agent without initiating a new connection to the agent.

* * * * *